United States Patent
Burock et al.

(10) Patent No.: US 12,060,160 B2
(45) Date of Patent: Aug. 13, 2024

(54) PLASTIC CAPS FILLED WITH SEALING COMPOUND AS COMBINED PROTECTION AGAINST FUEL AND HYDRAULIC FLUID AND AGAINST LIGHTNING STRIKES

(71) Applicant: Chemetall GmbH, Frankfurt (DE)

(72) Inventors: Heinz Burock, Frankfurt am Main (DE); Hendrik Becker, Frankfurt am Main (DE)

(73) Assignee: CHEMETALL GMBH, Frankfurt (DE)

( * ) Notice: Subject to any disclaimer, the term of this patent is extended or adjusted under 35 U.S.C. 154(b) by 1165 days.

(21) Appl. No.: 16/498,517

(22) PCT Filed: Mar. 26, 2018

(86) PCT No.: PCT/EP2018/057572
§ 371 (c)(1),
(2) Date: Dec. 3, 2019

(87) PCT Pub. No.: WO2018/184878
PCT Pub. Date: Oct. 11, 2018

(65) Prior Publication Data
US 2020/0087003 A1    Mar. 19, 2020

(30) Foreign Application Priority Data
Apr. 3, 2017  (DE) .......................... 102017205634.7

(51) Int. Cl.
| | |
|---|---|
| *B64D 45/02* | (2006.01) |
| *C09K 3/10* | (2006.01) |
| *F16B 33/00* | (2006.01) |
| *F16B 37/14* | (2006.01) |
| *F16B 13/00* | (2006.01) |

(52) U.S. Cl.
CPC ............ *B64D 45/02* (2013.01); *C09K 3/1012* (2013.01); *F16B 33/004* (2013.01); *F16B 37/14* (2013.01); *F16B 2013/006* (2013.01)

(58) Field of Classification Search
CPC . B64D 45/02; C09K 3/1012; F16B 2013/006; F16B 37/14; F16B 33/004
See application file for complete search history.

(56) References Cited

U.S. PATENT DOCUMENTS

| | | | |
|---|---|---|---|
| 2011/0135735 A1* | 6/2011 | Steinruecke | A61L 29/12 424/617 |
| 2013/0153136 A1* | 6/2013 | Day | F16J 15/064 174/138 D |
| 2017/0008636 A1* | 1/2017 | Gaw | B64D 45/02 |
| 2017/0108029 A1* | 4/2017 | Song | F16B 37/14 |
| 2017/0190442 A1* | 7/2017 | Zook | B64D 37/06 |
| 2019/0162223 A1* | 5/2019 | Burock | F16B 37/14 |

FOREIGN PATENT DOCUMENTS

| | | |
|---|---|---|
| DE | 10117251 A1 | 10/2002 |
| EP | 2604893 A1 | 6/2013 |
| JP | 4635344 B2 * | 2/2011 |
| WO | 2014172302 A1 | 10/2014 |
| WO | 2014172305 A1 | 10/2014 |
| WO | 2016106364 A1 | 6/2016 |
| WO | 2018019848 A1 | 2/2018 |

OTHER PUBLICATIONS

Dielectric Strength Unit, Formula & Test Methods of Materials, Omnexus, pp. 6-11, 2023.*
Foreign Application Detailing various polyetherimide applications (Year: 2011).*
International Search Report for International Application No. PCT/EP2018/057572, mailed Aug. 16, 2018 (2 pages).
"Kohäsion", Wikipedia, retrieved on Sep. 23, 2019, 4 pages.
"Polysulfide", Wikipedia, retrieved on Sep. 23, 2019, 5 pages.

* cited by examiner

*Primary Examiner* — Tye William Abell
(74) *Attorney, Agent, or Firm* — Armstrong Teasdale LLP

(57) ABSTRACT

Provided herein are sealing compound-filled plastic caps for sealing of connecting elements in aircraft construction against liquids, wherein these plastic caps function as combined protection against fuel and hydraulic oil, especially that based on tributyl phosphate, and against lightning strikes, and can be produced and applied in an economically viable manner. The plastic cap for sealing of connecting elements in aircraft construction consists predominantly of at least one high-performance polymer having a breakdown resistance of at least 10 kV/mm to DIN IEC 60243, and has been filled with a sealing compound having a high energy absorption capacity and including at least one filler selected from the group consisting of gas- and/or air-filled hollow packings, where the plastic cap and the sealing compound are cohesively bonded to one another. Additionally provided is a method of filling and application of such plastic caps, and a corresponding aircraft.

10 Claims, 3 Drawing Sheets

PRIOR ART

PRIOR ART

PLASTIC CAPS FILLED WITH SEALING COMPOUND AS COMBINED PROTECTION AGAINST FUEL AND HYDRAULIC FLUID AND AGAINST LIGHTNING STRIKES

CROSS-REFERENCE TO RELATED APPLICATIONS

This application is a U.S. National Phase Application of PCT/EP2018/057572, filed Mar. 26, 2018, which claims the benefit of priority to DE Application No. 102017205634.7, filed Apr. 3, 2017, the contents of which are hereby expressly incorporated by reference in their entirety.

The present invention is in the field of sealing of connecting elements in aircraft construction. It relates to sealing compound-filled plastic caps that function as combined protection against fuel and hydraulic oil and against lightning strikes. In addition, the invention includes a method of filling and application of such plastic caps and a corresponding aircraft.

In the aircraft industry, connecting elements, especially rivets, rivet heads and screw connections, are coated with sealing compound in order to seal them off from fuel and hydraulic oil and protect them from corrosion by moisture and also by electrochemical reaction.

Such sealing additionally prevents the possible loss of fuel via leaky sites at the connecting elements, and also a pressure drop within the aircraft.

In parts of an aircraft that are at particular risk, there is also use of special plastic caps sealed with sealing compound (=seal caps) which, by virtue of their complex construction—in the form of a twin-shell construction with an integrated air gap—are additionally intended to provide protection from lightning strikes. Configurations of such seal caps are known in the art and are depicted, for example, in FIGS. 1-3 of U.S. Patent Publication No. 2013/015316.

Both the filling of these caps with sealing compound and the application thereof, i.e. the mounting thereof on the connecting elements to be sealed, is very complex. Moreover, the surface of the caps has to be painted in order to assure good adhesion of the sealing compound on the inside.

A barrier to widespread use of this technique has to date been the comparatively uneconomic production and assembly of said seal caps.

It was therefore an object of the present invention to provide sealing compound-filled plastic caps for sealing of connecting elements in aircraft construction against liquids, wherein these plastic caps function as combined protection against fuel and hydraulic oil, especially that based on tributyl phosphate, and against lightning strikes, and can be produced and applied in an economically viable manner.

More particularly, these caps are to have an extended spectrum of use or higher variability than the existing seal caps and enable a distinct increase in frequency in aircraft construction.

The object was achieved by a plastic cap as claimed in claim 1, a method as claimed in claim 13 and an aircraft as claimed in claim 15. Preferred embodiments are each described in the dependent claims.

The plastic cap of the invention for sealing of connecting elements in aircraft construction consists predominantly of at least one high-performance polymer, has a breakdown resistance of at least 10 kV/mm to DIN IEC 60243 and has been filled with a sealing compound having a high energy absorption capacity and including at least one filler selected from the group consisting of gas- and/or air-filled hollow packings. The plastic cap and the sealing compound here have been cohesively bonded to one another.

BRIEF DESCRIPTION OF DRAWINGS

FIG. 1 is a schematic, side elevation in section of the disclosed seal applied to a swaged butt joint;

FIG. 2 is a schematic, side elevation in section of the disclosed seal applied to a cap seal; and FIG. 3 is a detail showing a side elevation in section of an alternate embodiment of the disclosed seal as applied to a cap seal.

Definitions

Figure 1:
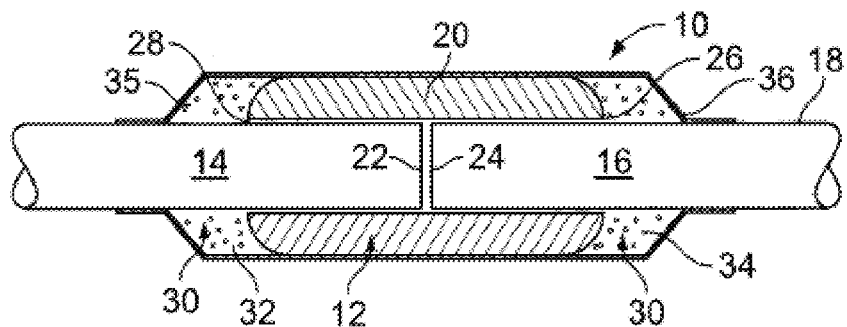
FIGS. 1-3 are prior art drawings described in U.S. Patent Publication No. 2013/0153136. These prior art drawings are non-limiting and are provided solely to facilitate understanding.
Figure 2:
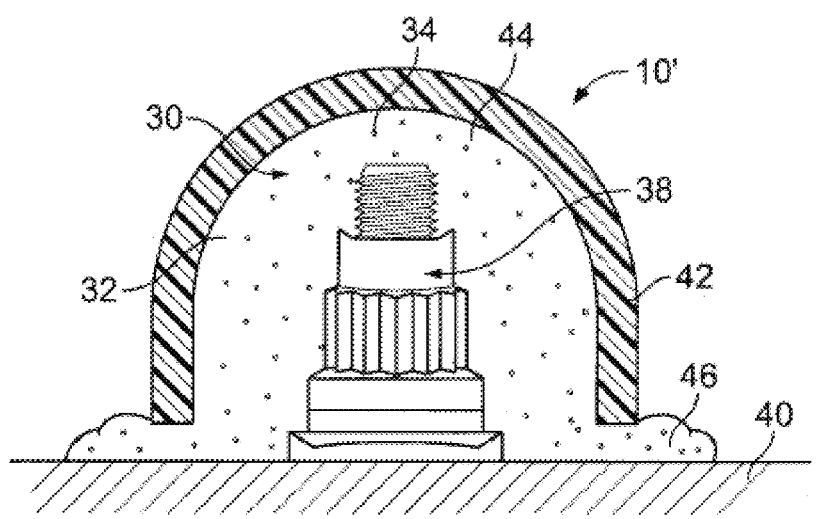
Figure 3:
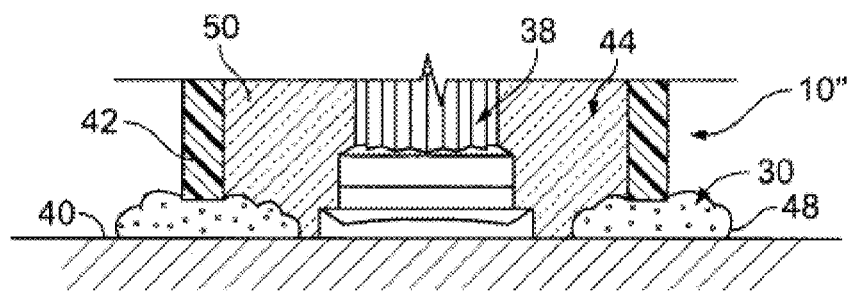

Where "high-performance polymer" is mentioned in the present context, what are meant are homo- and copolymers that feature high chemical and thermal stability.

What is meant by "plastic cap [ . . . ] consists predominantly of at least one high-performance polymer" is that it may still have a content of less than 50% by weight of other constituents that are not high-performance polymers.

A "sealing compound" in the present context is always intended to mean the mixture of two sealing compound components that can be cured chemically, thermally and/or by actinic radiation and have not yet cured at least to some degree.

What should be understood by "the plastic cap and the sealing compound are cohesively bonded to one another" is that the sealing compound introduced and the at least one high-performance polymer cannot be separated nondestructively or cannot be separated under the conditions customary in the operation of an aircraft.

When the "filling and application [ . . . ] of the plastic cap", i.e. of a plastic cap, in the method of the invention is mentioned, this shall also include performance of the method with more than one plastic cap.

By virtue of the combination of excellent sealing properties against fuel, especially against kerosene, with stability to hydraulic oil, especially that based on tributyl phosphate such as Skydrol® (Solutia, Inc.), and with the ability to absorb energy with simultaneously high breakdown resistance against lightning strikes, the sealing compound-filled plastic caps of the invention have a broader spectrum of use than conventional seal caps that are used solely in regions of the aircraft in which sealing of rivet or screw connections is a priority.

In the application of the seal caps of the invention, exact differentiation between different critical areas—those that are prone to lightning strikes and those requiring only general sealing—is less important than in the case of conventional seal caps. As a result, it is possible to distinctly increase frequency in aircraft construction.

The preferred features and embodiments of the sealing compound-filled plastic caps of the invention are elucidated hereinafter.

The at least one high-performance polymer in the plastic cap is especially selected from the group consisting of polyvinylidene fluoride (PVDF), polysulfone (PSU), polyphenylene sulfone (PPSU), polyetheretherketone (PEEK), polyimide (PI), polyamideimide (PAI), polybenzimidazole (PBI), polyetherimide (PEI) and polyphenylene sulfide (PPS).

Further preferably, the at least one high-performance polymer in the plastic cap is a polyetherimide and/or a polyphenylene sulfide. The aforementioned high-performance polymers have particularly high stability both to kerosene, the fuel, and to hydraulic oils based on tributyl phosphate, such as Skydrol® (Solutia, Inc.).

More preferably, the at least one high-performance polymer is a polyetherimide. This is because polyetherimides have a breakdown resistance of 16 kV/mm to DIN IEC 60243. Most preferably, the at least one high-performance polymer is ULTEM™ 9075 resin (Sabic Innovative Plastics).

The breakdown resistance of the plastic cap is preferably at least 13 kV/mm and more preferably at least 15 kV/mm to DIN IEC 60243. A high breakdown resistance has the advantage of still further increasing the protective effect of the filled plastic cap against lightning strikes.

The at least one high-performance polymer may be in linear or branched form. Advantageously, it has been impact-modified, i.e. filled with glass fibers, carbon fibers and/or mineral fibers and hence mechanically strengthened.

The at least one high-performance polymer preferably has a water absorption of not more than 1.5%, more preferably of not more than 0.4% and most preferably of not more than 0.2%. A low water absorption is advantageous since this further lowers the electrical conductivity and there is no change in the material properties.

Preferably, the sealing compound filled into the plastic cap is one based on polysulfide and/or polythioether. More preferably, it is a polysulfide and/or a polythioether in combination with manganese dioxide, an isocyanate compound, an isocyanate prepolymer and/or an epoxy compound as hardener.

The sealing compound preferably has a density between 0.7 and 1.5 g/cm$^3$, more preferably between 1.1 and 1.3 g/cm$^3$. A density within the limits mentioned is advantageous since a reduction in the weight of the sealing compound applied is thus achieved.

The inventive use of gas- and/or air-filled hollow packings as fillers has the advantage that these have an energy-absorbing effect by virtue of the microcellular character. The gas- and/or air-filled hollow packings are preferably microballoons.

The sealing compound preferably has a content of the at least one filler in the range from 1% to 13% by weight, more preferably in the range from 4% to 7% by weight. A content within the limits mentioned is advantageous since the mechanical indices of the sealing compound are thus still fulfilled.

In a very particularly preferred embodiment, the sealing compound comprises a filler combination consisting of at least one filler selected from the group consisting of gas- and/or air-filled hollow packings and of at least one further filler selected from the group consisting of mineral and polymeric, non-gas-and/or-air-filled fillers. The use of the filler combinations mentioned has the advantage that the particular demands on such a sealing compound are fulfilled. The gas- and/or air-filled hollow packings are preferably microballoons here too.

The sealing compound preferably has a content of the at least one gas- and/or air-filled hollow packing in the range from 1% to 13% by weight, more preferably in the range from 4% to 7% by weight, and a content of the at least one further filler in the range from 10% to 25% by weight, more preferably in the range from 15% to 23% by weight. Contents within the limits mentioned are advantageous since this results in particularly positive material properties, especially with regard to tensile strength, elongation and stability.

The plastic cap and the sealing compound filled into it are preferably cohesively bonded to one another in that a chemical attachment of sealing compound and plastic cap is achieved.

The present invention also provides a method of filling and applying the above-described plastic cap of the invention, in which the plastic cap is filled with the above-described sealing compound by means of a metering robot or manually, then applied to a connecting element in an aircraft by means of an automated method step or manually, and the sealing compound is cured.

The curing is preferably undertaken thermally and/or by means of IR rays.

A feature of the method of the invention is its exceptional economic viability since it includes the use of preformed plastic caps that are filled with a freshly mixed sealing compound immediately prior to application.

Since no special logistics are needed for the transport and storage of the plastic caps and the sealing compound with necessary approval is generally available at the construction site, the method of the invention additionally has high variability.

The use of the sealing compound-filled plastic caps of the invention enables a reduction in manual activity in the filling and fitting of the sealing caps and, as a result, in turn, a distinct increase in frequency in aircraft construction.

In a preferred embodiment, the plastic cap is therefore filled with the sealing compound by means of a metering robot and then applied to a connecting element in an aircraft by means of an automated method step.

Finally, the present invention also relates to an aircraft having at least one connecting element to which a plastic cap of the invention has been applied by the method of the invention.

EXAMPLES

Lightning-proof plastic caps of the invention have been tested for their stability to hydraulic oil and fuel.

Test Setup:

Titanium screws were mounted with the aid of titanium nuts on correspondingly drilled carbon fiber sheets.

Plastic caps that consisted of a polyetherimide (PEI) and had been filled with a sealing compound that was a polysulfide containing with up to 4% by weight of gas-filled microballoons were fitted onto said screws and nuts. The sealing compound was then cured at 23°C for 14 days, in the course of which the plastic cap and the sealing compound were cohesively bonded to one another.

Subsequently, some of the plastic caps filled with cured sealing compound were stored in hydraulic oil (HyJet IV A$^+$) at 70° C. for 168 hours, and some others were stored in kerosene (Jet A1) at 100° ° C. for 336 hours.

The plastic caps that had been stored in hydraulic oil, those that had been stored in kerosene and those that had not been stored were then each fixed in a metal block having a corresponding cutout. The metal blocks were then pulled away from the carbon fiber sheets at right angles by means of a machine. At the same time, the force required to pull the plastic caps away from the screws and nuts was ascertained ("pull-off force").

In addition, after the plastic caps had been pulled off, the cohesion failure on the plastic caps and the visual appearance of the sealing compound were ascertained by inspection. Cohesion failure is defined here such that the rivet connection and the plastic cap are completely covered with sealing compound.

The results obtained are summarized in tab. 1 below.

TABLE 1

| Storage of the plastic caps in . . . | Pull-off force in N | Cohesion failure on the plastic caps in % | Visual appearance of the sealing compound |
|---|---|---|---|
| — | 354 | 100 | OK, normal fracture |
| Hydraulic oil | 312 | 100 | OK, normal fracture |
| Kerosene | 332 | 100 | OK, normal fracture |

As can be inferred from tab. 1, there was no significant change in results when the plastic caps were stored in hydraulic oil or in kerosene.

The invention claimed is:

1. A plastic cap for sealing of connecting elements in aircraft construction, which:
   - comprises at least 50 wt % of at least one polymer,
   - has a breakdown resistance of at least 10 kV/mm to DIN IEC 60243, and
   - has been filled with a sealing compound including at least one filler selected from the group consisting of gas- and/or air-filled hollow packings,
   - wherein the hollow packings in the at least one filler are microballoons,
   - wherein the sealing compound has a content of the at least one filler in the range from 1% to 7% by weight,
   - wherein the plastic cap and the sealing compound are cohesively bonded to one another, and
   - wherein the at least one polymer is a polyetherimide.

2. The plastic cap according to claim 1, wherein the at least one polymer has been impact-modified.

3. The plastic cap according to claim 1, wherein the at least one polymer has a water absorption of not more than 1.5%.

4. The plastic cap according to claim 1, wherein the sealing compound has a density between 0.7 and 1.5 g/cm$^3$.

5. The plastic cap according to claim 1, wherein the sealing compound comprises a filler combination consisting of at least one filler selected from the group consisting of gas- and/or air-filled hollow packings and of at least one further filler selected from the group consisting of mineral and polymeric, non-gas-and/or-air-filled fillers.

6. The plastic cap according to claim 1, wherein the plastic cap and the sealing compound are cohesively bonded to one another by a chemical attachment.

7. The plastic cap according to claim 1, wherein the plastic cap is stable to kerosene and hydraulic oil.

8. An aircraft having at least one connecting element to which a plastic cap according to claim 1 has been applied.

9. A method of filling and mounting a plastic cap according to claim 1, wherein the plastic cap is filled with a sealing compound according to claim 1 by means of a metering robot or manually, then applied to a connecting element in an aircraft by means of an automated method step or manually, and the sealing compound is cured.

10. The method according to claim 9, wherein the plastic cap is filled with the sealing compound by means of a metering robot and then applied to a connecting element in an aircraft by means of an automated method step.

* * * * *

UNITED STATES PATENT AND TRADEMARK OFFICE
CERTIFICATE OF CORRECTION

| | |
|---|---|
| PATENT NO. | : 12,060,160 B2 |
| APPLICATION NO. | : 16/498517 |
| DATED | : August 13, 2024 |
| INVENTOR(S) | : Burock et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this
Twelfth Day of November, 2024

Katherine Kelly Vidal
*Director of the United States Patent and Trademark Office*